L. A. CARTER.
POWER TRANSMISSION MECHANISM.
APPLICATION FILED DEC. 3, 1920.

1,414,622.

Patented May 2, 1922.

INVENTOR:
Lionel A. Carter
HIS ATTORNEYS.

UNITED STATES PATENT OFFICE.

LIONEL A. CARTER, OF ST. LOUIS, MISSOURI.

POWER-TRANSMISSION MECHANISM.

1,414,622.     Specification of Letters Patent.     Patented May 2, 1922.

Application filed December 3, 1920. Serial No. 428,055.

*To all whom it may concern:*

Be it known that I, LIONEL A. CARTER, a subject of Great Britain, and a resident of the city of St. Louis and State of Missouri, have invented a new and useful Improvement in Power-Transmission Mechanism, of which the following is a specification.

This invention relates principally to friction clutches for transmission mechanisms and is particularly adapted for use with power transmission gearing wherein the shafts are required to be put into and out of gear or to have their relative direction of rotation reversed. The invention has for its principal object to eliminate the use of complicated devices for retaining the clutch elements in driving position and to eliminate the necessity for adjustments of the clutch retaining device to take up wear of the clutch elements. Another object is to provide a friction clutch whose holding capacity will increase automatically as the load on the drive shaft increases. The invention consists principally in the improved manner of retaining the clutch elements in driving position; and it also consists in parts and arrangements of parts hereinafter described and claimed.

Figure 1:
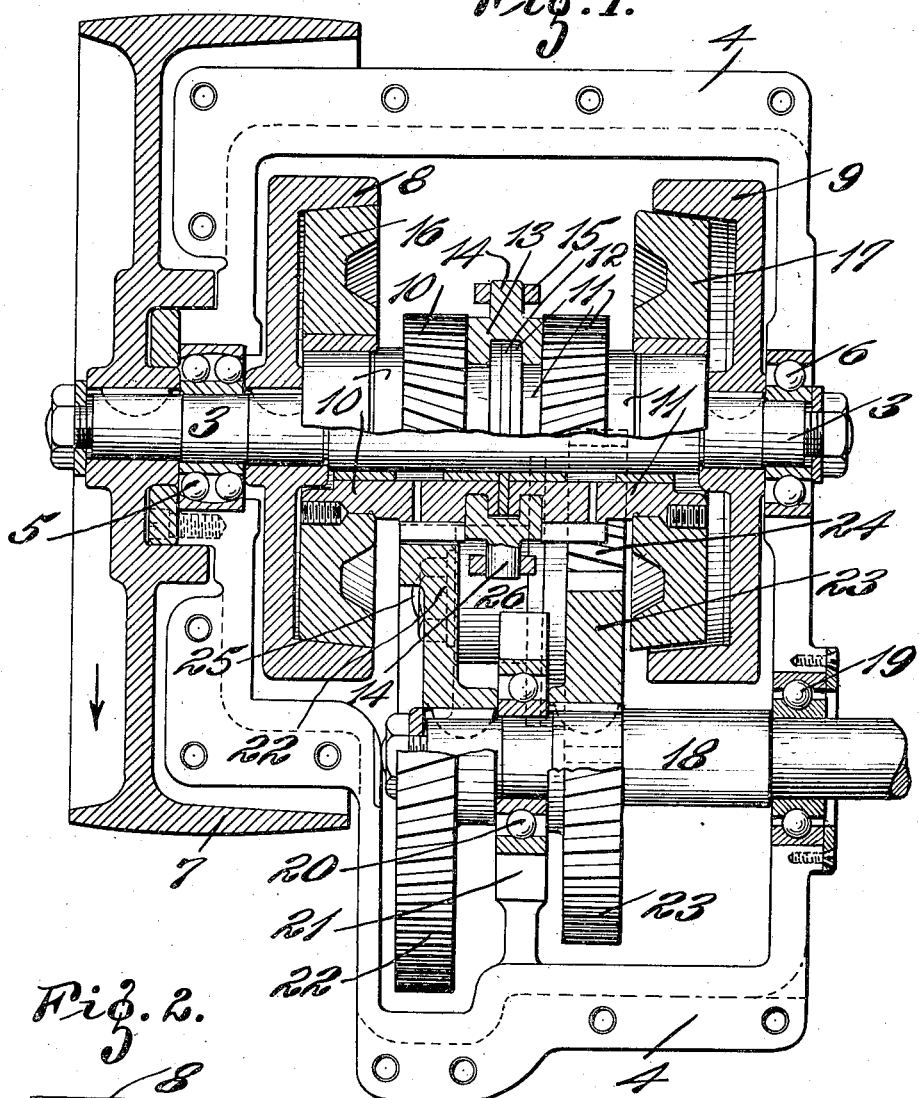
Figure 2:
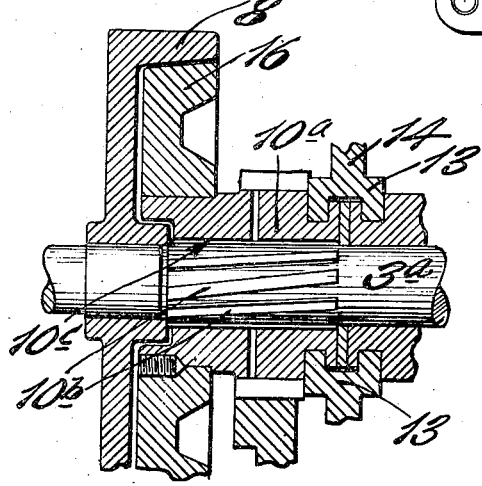

In the accompanying drawing, which forms part of this specification, and wherein like symbols refer to like parts wherever they occur, Fig. 1 is a plan view of a gear case, with the cover removed, showing a power transmission device and reversing clutch therefor and a means embodying my invention for maintaining the cooperating surfaces of the clutch elements in contact when thrown into gear, the gears and clutch member being shown partly in plan and partly in section to more clearly illustrate the invention; and Fig. 2 is a detail view of the drive shaft and one of the shiftable pinions, showing a modified form of the invention.

Referring to the drawing, a drive shaft 3 extends through a gear casing or housing 4 and has its opposite end portions reduced and journaled in suitable bearings 5 and 6 in the opposite side walls of said casing. The drive shaft 3 projects beyond the bearing 5 and has a pulley 7 keyed thereon. Keyed to the shaft 3, between the bearings 5 and 6 in the opposite side walls of the casing 4 and the shoulders formed by the reduced end portions of said shaft, are exterior forward and backward drive friction members 8 and 9, which form one of the clutch elements of a pair of friction clutches. The exterior friction members 8 and 9 are preferably in the form of hollow cones which face each other. Journaled on the drive shaft 3, between the hollow cones 8 and 9 and slidable therebetween are forward and backward drive gears 10 and 11. A thrust washer 12 is arranged between the adjacent ends of the hub portions of the gears 10 and 11. The hub portions of the gears 10 and 11 are provided with annular grooves adapted to receive the spaced annular flanges of a shifter ring 13. The shifter ring 13 is provided with oppositely disposed pins 14, which are embraced by the notched arms of a forked clutch shifter lever 15 fixed to a rock-shaft (not shown). Keyed on the outer ends of the forward and backward drive gears 10 and 11 are friction cones 16 and 17 whose peripheral portions are of an angle corresponding to the angle of the interior surface of the hollow forward and backward cones 8 and 9. The hollow cones 8 and 9, which are keyed to the opposite ends of the shaft 3, together with the cones 16 and 17 fixed to the slidably journaled forward and backward drive gears 10 and 11, form the exterior and interior clutch members of a pair of friction cone clutches.

A driven shaft 18 which is disposed parallel with the drive shaft 3, is journaled in a bearing 19 in one side wall of the casing 4. The shaft 18 extends into the casing 4 and is journaled near its inner end in a bearing 20 supported in a pedestal 21, which projects upwardly from the bottom of the said casing. Fixed to the inner end of the shaft 18, at one side of the bearing 20 therefor, is a gear 22, which meshes permanently with the sliding forward drive gear 8 journaled on the driving shaft 3. Fixed to the shaft 18 on the other side of the bearing 20 is a gear 23, which meshes permanently with an idler gear 24 journaled on a stud 25 in a pedestal 26 which projects upwardly from the bottom of the casing 4. The idler gear 24 in turn meshes permanently with the sliding backward drive gear 11 on the driving shaft 3.

With the arrangement described, when the clutch shifter lever 15 is operated to force the cone 16 on the forward drive pinion 10 into operative engagement with the continuously rotating forward drive cone 8, the friction between the engaged surface of the forward drive cones 8 and 16 forces the forward drive pinion 10 to turn with the drive shaft 3, which pinion transmits a reverse rotary motion to the shaft 18 through the gear 22. When the clutch lever 14 is operated to force the cone 17 of the backward drive pinion 11 into operative engagement with the continuous rotating backward drive cone 9, the friction between the engaged surfaces of the backward drive cones 9 and 17 forces the backward drive pinion 11 to turn with the drive shaft 3, which pinion drives the shaft 18 in the same direction as the shaft 3 through the idler gear 24 and gear 23.

The cones 16 and 17 of the forward and backward drive pinions 10 and 11 are normally held out of engagement with the continuously rotating hollow cones 8 and 9 by means of the clutch shifter lever 15, thereby permitting the drive shaft 3 to rotate continuously without transmitting motion to the driven shaft 18.

The forward and backward drive pinions 10 and 11 on the drive shaft 3, together with the forward and backward drive gears 22 and 23 fixed to the driven shaft 18 and the idler gear 24, have spiral teeth. The teeth of the forward drive pinion 10 are in the form of right-handed helicals and the teeth of the backward drive pinion 11 are in the form of left-handed helicals; that is, the teeth of the pinions 10 and 11 are twisted in opposite directions with respect to the axis of the shaft 3. With this arrangement, when the cone 16 of the forward drive pinion 10 is thrown into mesh with the hollow cone 8 fixed to the shaft 3, the obliquity of the teeth causes an end thrust on said pinion, which thrust, by reason of the right-handed teeth of the pinion is in the direction of the cone 18, thereby forcing the cone 16 of the pinion into operative engagement with the hollow cone 8 on the shaft 3. When the pinions 10 and 11 are slid along the shaft 3 to move the cone 17 of the backward drive pinion 11 into contact with the hollow cone 17 on the shaft 3, the obliquity of the teeth of the said pinion causes an end thrust on said gear, which thrust, by reason of the left-handed teeth of the pinion, is in the direction of the hollow cone 9, thereby forcing the cone 17 of the pinion into operative engagement with the hollow cone 9 on the shaft 3.

The obliquities of the teeth of the pinions 10 and 11 create an end thrust sufficient to keep the cooperating surfaces of the clutch elements on the gears 10 and 11 and shaft 3 in engagement with each other without requiring special holding devices for the purpose. The end thrust created by the helical teeth of the pinion 10 and 11 acts also to automatically take up wear of contacting surfaces of the friction cones, thereby eliminating the use of separate devices heretofore used for this purpose. As the load on the driven shaft increases, there is a corresponding increase in the end pressure on the pinions 10 and 11, thereby increasing the friction between the engaged surfaces of the cones and preventing slipping of the clutch elements under an increasing load. It is obvious that, if the teeth of one gear are right-handed, the teeth of the gear meshing therewith will be left-handed.

Fig. 2 shows a modified form of the invention. In this figure an ordinary spur gear pinion $10^a$ is shown instead of the helical gear pinion 10 shown in Fig. 1. The end thrust necessary to hold the cooperating surfaces of the interior and exterior cones 16 and 8 in engagement is obtained by means of helical ridges $10^b$ formed on the drive shaft $3^a$ and adapted to mesh with helical grooves $10^c$ formed in the hub of the drive pinion $10^a$. With this arrangement, an end thrust is transmitted to the drive pinions with the use of ordinary spur gears throughout the transmission mechanism.

The hereinbefore described arrangement admits of considerable modification without departing from the invention; therefore, I do not wish to be limited to the exact form of drive gearing or details of construction shown and described.

What I claim is:

1. A power transmission mechanism comprising a drive shaft, a driven shaft, a pinion slidably mounted on said drive shaft, a gear fixed to said driven shaft and meshing with said pinion, cooperating clutch elements fixed to said drive shaft and to said pinion respectively, means for actuating said pinion to cause the clutch element thereof to engage the clutch element of said drive shaft, said pinion having helically disposed reaction surfaces adapted to cause an end thrust on said pinion sufficient to maintain the clutch element of said pinion in operative engagement with the clutch element of said drive shaft.

2. A power transmission mechanism comprising a drive shaft, a driven shaft, a slidable drive wheel journaled on said drive shaft, a driven wheel fixed to said driven shaft and cooperating with said drive wheel, cooperating clutch elements fixed to said drive shaft and to said drive wheel respectively, means for actuating said drive wheel to cause the clutch element thereof to engage the clutch element of said drive shaft, and means on said drive wheel and said driven wheel for creating a pressure endwise on said pinion sufficient to maintain the clutch element of said pinion in operative engagement with the clutch element of said drive shaft, said end pressure being adapted to automatically increase with an increased load on said driven shaft.

3. A power transmission mechanism comprising a drive shaft, a driven shaft, a slidable drive wheel journaled on said drive shaft, a driven wheel fixed to said driven shaft and cooperating with said drive wheel, cooperating clutch elements fixed to said drive shaft and to said drive wheel respectively, means for actuating said drive wheel to cause the clutch element thereof to engage the clutch element of said drive shaft, and means on said drive wheel and said driven wheel for creating a pressure endwise on said pinion sufficient to maintain the clutch element of said pinion in operative engagement with the clutch element of said drive shaft, said end pressure being adapted to automatically increase with an increased load on said driven shaft, said means comprising intermeshing spiral ridges and grooves formed on said drive wheel and said driven wheel.

4. A power transmission mechanism comprising a drive shaft, a driven shaft, a drive wheel slidably mounted on said drive shaft, a driven wheel fixed to said driven shaft and cooperating with said drive wheel, cooperating clutch elements fixed to said drive shaft and to said drive wheel respectively, means for actuating said drive wheel to cause the clutch element thereof to engage the clutch element of said drive shaft, said drive wheel having portions formed thereon adapted to cause an end thrust on said driving gear sufficient to maintain the clutch element of said driving gear in operative engagement with the clutch element of said drive shaft.

5. A power transmission device comprising a drive shaft and a driven shaft, a pinion journaled on said shaft, and arranged for movement longitudinally thereof, a gear fixed to said driven shaft and meshing with said pinion, cooperating clutch elements fixed to said drive shaft and to said pinion respectively, means for actuating said pinion to cause the clutch element carrier thereby to engage the clutch element fixed to said drive shaft, said pinion having helical teeth, the obliquity of which causes an end thrust on said pinion in the direction of the clutch element on said driven shaft, thereby maintaining the clutch elements of said drive shaft and said pinion in operative engagement during the rotation of said pinion regardless of wear of the engaged surfaces of said clutch elements, said end pressure increasing with an increased load on the driven shaft.

6. A power transmission mechanism comprising a drive shaft and a driven shaft, pinions journaled on said drive shaft and movable longitudinally thereof, gears fixed to said driven shaft and meshing with said pinions, cooperating clutch elements fixed to said driven shaft and to said pinions respectively, means for actuating a pinion to cause the clutch element thereof to engage a clutch element of said drive shaft, said pinions having helical teeth, the obliquity of which causes an end thrust thereon in the direction of one of the clutch elements of said drive shaft, whereby the clutch element of the clutch pinion is maintained in contact with the cooperating clutch element of said driven shaft during the rotation of clutch pinions irrespective of the wear of the cooperating surfaces of said clutch elements, the end thrust of the clutched pinion increasing as the load on said drive shaft increases.

7. In a power transmission mechanism comprising a driving shaft and a driven shaft, forward and rearward drive pinions journaled on said drive shaft and slidable longitudinal thereof, a gear fixed to said drive shaft and meshing with said forward drive pinion, a gear fixed to said driven shaft and meshing with an idler gear which in turn meshes with said rearward drive pinion, cooperating clutch elements fixed to said driving shaft and to each of said drive pinions, means for actuating said pinion to bring the clutch element of one or the other of said pinions into engagement with one of the clutch elements of the driving shaft, said drive pinions, said idler gear and the gears on said drive shaft having helical teeth the obliquity of which causes an end thrust on the clutched pinion in a direction which will maintain the clutch element thereof in operative engagement with one of the clutch elements of the driving shaft during rotation of the said pinions, said end thrust increasing as the load on said driven shaft increases.

8. In a power transmission mechanism comprising a driving shaft and a driven shaft, clutch members fixed to said driving shaft and spaced apart longitudinally thereon, forward and rearward drive pinions journaled on said driving shaft between said clutch members and slidable along said shaft therebetween, a gear fixed to said driven shaft and meshing with said forward drive pinion, an idler gear meshing with a second gear on said driven shaft and with said rearward drive pinion, clutch members fixed to said pinions and adapted to cooperate with the clutch members on said driving shaft, said forward and backward drive pinion having helical teeth of reversed angles which causes an end thrust on said pinions in the direction of the clutch member of the driving shaft, thereby maintaining the clutch members of the clutch pinion in engagement with the cooperating clutch member on the driven shaft regardless of wear of the parts, said end pressure increasing with an increased load on said driven shaft.

Signed at St. Louis, Missouri, this 30th day of Nov., 1920.

LIONEL A. CARTER.